United States Patent [19]

Shiraiwa et al.

[11] 4,336,923
[45] Jun. 29, 1982

[54] STEEL SURFACE INSPECTION APPARATUS

[75] Inventors: Toshio Shiraiwa, Ikoma; Tatsuo Hiroshima, Nishinomiya; Takahide Sakamoto, Minoo, all of Japan

[73] Assignee: Sumitomo Metal Industries, Ltd., Osaka, Japan

[21] Appl. No.: 262,066

[22] PCT Filed: May 25, 1979

[86] PCT No.: PCT/JP79/00134
§ 371 Date: Apr. 10, 1980
§ 102(e) Date: Apr. 10, 1980

[87] PCT Pub. No.: WO80/02667
PCT Pub. Date: Dec. 11, 1980

[51] Int. Cl.³ .............................................. B23K 7/08
[52] U.S. Cl. ................................................... 266/51
[58] Field of Search ............................ 266/51; 148/9.5

[56] References Cited

U.S. PATENT DOCUMENTS 2,283,932  5/1942  Jones ..................................... 266/75
4,243,436  1/1981  Engel ..................................... 266/51

FOREIGN PATENT DOCUMENTS 36-12255  8/1961  Japan .
42-11838  7/1967  Japan .
46-26159  9/1971  Japan .
49-26884  3/1974  Japan .
52-96084  8/1977  Japan .

Primary Examiner—W. Stallard
Attorney, Agent, or Firm—Wenderoth, Lind & Ponack

[57] ABSTRACT

Surface defects occurring periodically in specific regions of the surface of steel material are removed by moving a detector head having a scarfing torch disposed forwardly of a detector probe for scanning along a predetermined path, during which the surface of the scanning path is scarfed smooth and detected by said head, and the surface defects are scarfed away according to the results of the detection.

2 Claims, 4 Drawing Figures

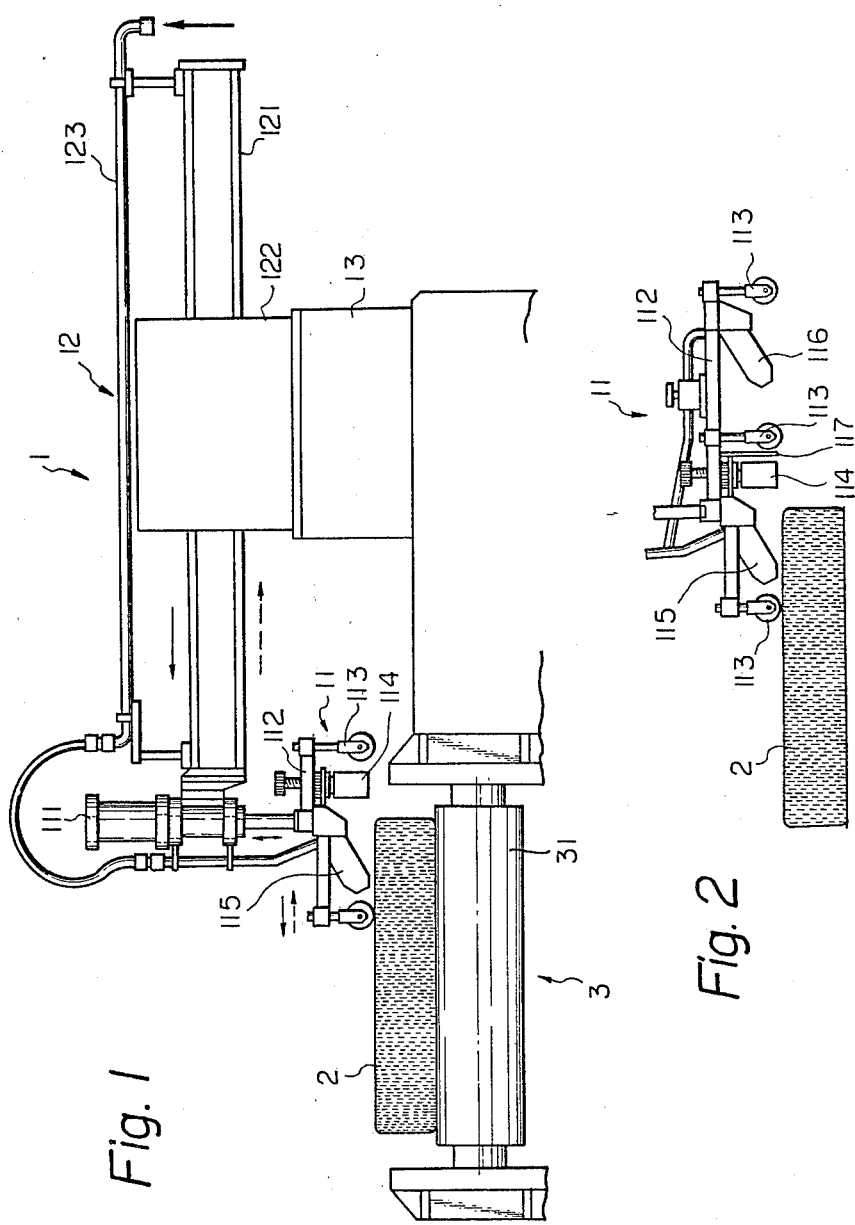

STEEL SURFACE INSPECTION APPARATUS

DESCRIPTION

1. Technical Field

The present invention relates to an apparatus for automatically detecting surface defects of a steel material such as a steel piece or a cast steel piece having inferior surface conditions and for automatically removing such defects according to the results of the detection.

2. BACKGROUND AND PRIOR ART

Heretofore used methods for automatically detecting surface defects such as surface flaws and cracks in a steel material such as a steel piece or a cast steel piece are, for example, an ultrasonic testing method, a magnaflux method, and an eddy current method. These testing methods are highly automated and, accordingly employed widely in surface inspection of mass production of, for example, semifinished steel. The detection ability of each of these method varies with positions and conditions of the surface detects. In the case where the surface conditions of the material to be inspected are very bad, any of the above methods considerably decreases in the detection ability. In inspection of semifinished steel, such as slabs and billets, whose surface has a thick layer of oxides and is rough, the inspection ability is unavoidably reduced unless the layer of oxides is removed and the surface to be inspected is smoothed. Accordingly, application of the prior art automatic flaw inspection methods was limited to test pieces of relatively good surface conditions. For example, in a cast steel piece such as a slab and a billet produced by continuous casting, periodical wave-like marks (oscillation marks) characteristic of continuously cast pieces can occur. Heretofore, it was almost impossible to automatically detect such wave-like marks directly or without smoothing the surface of the cast steel piece to be inspected.

The surface defects such as surface flaws or cracks in the steel piece or cast steel piece, when processed into, for example, steel plates or pipes in the succeeding steps, often turn out to be serious defects in the products. Accordingly, the surface defects in the steel pieces or the cast steel pieces must be removed prior to further processing. The surface defects such as surface flaws in a steel material are removed usually by scarfing. In continuous casting, a step for scarfing the entire surface layer of the cast steel piece is added as a pretreatment step to the surface defect inspection.

In the prior art surface inspection, as described above, the pretreatment step of the surface of the piece to be inspected, the inspection step and the defect removing step were performed individually in separate stations and, accordingly, required a rather large amount of time, labor and space. Further, some defects could pass the inspection without being detected and the reliability of the prior art inspection was not high.

Recently, an improved surface inspection method for carrying out pretreatment, inspection and scarfing operations in one step was developed. However, this method in which the entire surface of the piece to be inspected was scarfed as a pretreatment was not efficient and not suitable for inspection of steel materials such, for example, as continuous cast steel pieces in which surface detects tend to appear periodically in specific regions of the surface.

3. Disclosure of Invention

An object of the present invention is to provide a highly efficient and reliable automatic inspection apparatus capable of detectig surface defects such as flaws and cracks occurring periodically in specific regions of the surface of a steel material such as a steel piece or a cast steel piece in the production process thereof and removing such surface defects according to the results of the inspection.

The apparatus according to the present invention comprises a detection head including a detector probe and a scarfing torch, a drive mechanism, for moving said detection head for scanning along a predetermined path, and a control device for controlling the operation of said detection head and said drive mechanism.

The detection head has a construction in which the scarfing torch is disposed forwardly of the detector probe with respect to the scanning direction of the head. With this construction, the region to be scanned of the material to be inspected is smoothed by the scarfing torch before flaw detection by the detector probe. When a surface defect is detected by the detector probe, the position and the conditions of the surface defect are memorized and, after a series of the defect detecting steps are finished, the detector head is moved again to scan the position of the surface defect which is then removed by the scarfing torch.

In an arrangement in which another scarfing torch is disposed rearwardly of the detector probe with respect to the scanning detection of the detector head, when a surface defect is detected, the detected surface defect can be immediately removed by the rearward scarfing torch.

The drive mechanism may be of a conventional type for moving the detector head relative to the material to be inspected.

The control device may be of a conventional type for transmitting a scan control signal which moves the detector head for scanning along a predetermined path by the drive mechanism and analyzing a detection signal from the detector probe to determine the position and the conditions (width, length, depth, and the like) of the surface defect, and transmitting a scarfing instruction to the detector head.

BRIEF DESCRIPTION OF THE DRAWINGS

The invention will be better understood from the following description taken in connection with the accompanying drawings in which:

FIG. 1 is a side view of the apparatus according to the present invention;

FIG. 2 is a side view of another embodiment of the detector head according to the present invention;

BEST MODE FOR CARRYING OUT THE INVENTION

Figure 3:
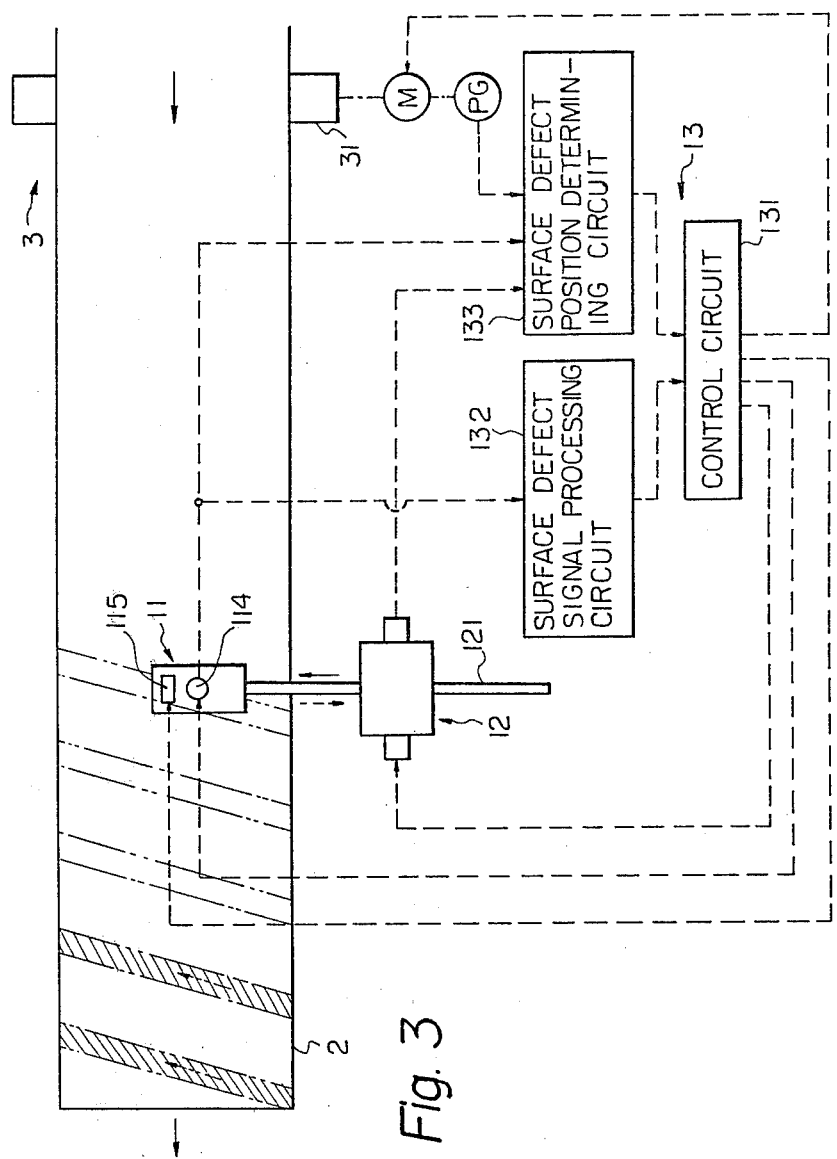
FIG. 3 is a schematic diagram for illustration of operation of the apparatus according to the present invention.

A steel surface inspection apparatus 1 according to the present invention is, as shown in FIG. 1, adjacent to a conveyor line 3 for a steel material 2 such, for example, as a steel piece, a cast steel piece or the like.

The inspection apparatus 1 comprises mainly a detection head 11, a drive mechanism 12, and a control device 13.

The detection head 11 comprises a fluid cylinder 111, a holder 112, guide rollers 113, a detector probe 114, and a scarfing torch 115. The fluid cylinder 111 is attached so as to be directed vertically downwardly at an end of a horizontally movable bar 121 of the drive mechanism 12 which will be described herein below. The holder 112 is attached at the free end of the piston rod of the fluid cylinder 111. The guide rollers 113 are attached at the opposite ends of the holder 112. The detector probe 114 and the scarfing torch 115 are attached at intermediate portions of the holder 112, respectively.

The present invention has a characteristic feature in the construction of the detection head 11 in that the scarfing torch 115 is disposed forwardly of the detector probe 114 with respect to the scanning direction of the detection head 11. The detector probe 114 is vertically adjustably attached to the holder 112 with respect thereto by any suitable means such, for example, as conventional screws.

In another embodiment of the present invention, as shown in FIG. 2, another scarfing torch 116 may be attached to the holder 112 rearwardly of the detector probe 114 with respect to the scanning direction of the detection head 11. In this embodiment, a shield plate 117 is preferably provided behind the detector probe 114 for shielding the detector probe 114 against a spark from the scarfing torch 116.

The detector probe 114 may be one selected from an ultrasonic inspection probe, a magnaflux inspection probe, and the like, in accordance with the inspecting conditions or types of the defects to be detected. In order to cope with the adverse thermal effects due to scarfing, the detector probe 114 is preferably provided with any suitable water cooling means.

The drive mechanism 12 may be any conventional mechanism for moving the detection head 11 relative to the steel material 2. Such mechanism is either a system for moving either one of the detection head or the steel material while holding the other stationary or a system for moving both of them in a predetermined relation. This embodiment adopts the latter system. Namely, as shown in FIG. 1, the drive mechanism 12 comprises a steel material conveyor unit 31, the horizontally movable bar 121, a drive unit 122, and a piping system 123. The steel material conveyor unit 31 may be a conventional roller conveyor for carrying the steel material 2 at a predetermined speed. The horizontally movable bar 121 is supported horizontally by the drive unit 122 and is moved in the horizontal direction by any suitable means such as hydraulic drive, gears or the like. At an end of the horizontally movable bar 121, as described hereinabove, the fluid cylinder 111 of the detection head 11 is vertically downwardly attached. Further, a piping system 123 for supplying scarfing gas to be discharged from the scarfing torches 115 and 116 of the detection head 11, oxygen for scarfing and water for cooling the detector probe 114, respectively, is disposed along the horizontally movable bar 121.

By driving the detection head 11 and the steel material 2 suitably, the detection head 11 scans the surface of the steel material along a predetermined zig-zag path.

The control device 13 may be a conventional control device for transmitting a scan control signal which moves the detector head 11 for scanning along the predetermined path by the drive mechanism 12, analyzing a detection signal from the detector probe 114 to determine the position and the conditions (width, length, depth, and the like) of the detected surface defect, and transmitting a scarfing instruction to the detector. An example of such control device will be described hereinunder with reference to FIGS. 3 and 4.

The operation of the apparatus according to the present invention will now be described. The operation of the embodiment in which only one scarfing torch 115 is provided in the detection head 111 will be described first with reference to FIGS. 1 and 3.

Firstly, as a preliminary stage, the fluid cylinder 111 is operated to bring the guide rollers 113 into engagement with the surface of the steel material and thereafter to adjust the distance between the detecting face of the detector probe 114 and the surface of the steel material.

Then, a detection head scan control signal is transmitted from a control circuit 131 provided in the control device 13 to the drive mechanism 12 for moving the detection head 11 to scan the surface of the steel material along the predetermined path, to start scarfing by the torch 115, and to start flaw detection by the probe 114.

As shown exaggeratively in FIG. 3, the scarfing torch 15 scarfs the surface of the steel material 2 in a predetermined width. By this operation, depressions and rises and a layer of oxides formed on the surface of the steel material are removed and smoothed into relatively good surface conditions, improving the defect detection ability of the probe 14. Then, the succeeding detector probe 114 inspects the surface of the steel material.

The detection signal from the detector probe 114 is transmitted to a surface defect signal processing circuit 132 and to a surface defect position determining circuit 133 disposed in the control device 13. When a surface defect is detected, the conditions (width, length, depth, and the like) of the defect are computed in the surface defect signal processing circuit 132, transmitted to the control circuit 131 and stored therein. At the same time, since actual movement signals are applied from the drive mechanism 12 to the surface defect position determining circuit 133 at every moment, the position of the surface defect is determined from the surface defect detection signal and the actual movement signals, applied to the control circuit 131 and stored therein.

After a series of scarfing and flaw detection operations in a predetermined region of the surface of the steel material have been finished in this way, the detection head 11 is moved to scan again along the previous scanning path, whereby the scarfing torch 115 scarfs the surface defects according to the surface defect position signal and the surface defect condition signals stored in the control circuit 131.

This embodiment may use the arrangement for performing the preliminary scarfing and flaw detection operations in the forward and the backward movement of the first scanning operation, respectively, and for scarfing the surface defects in the second scanning operation.

Figure 4:
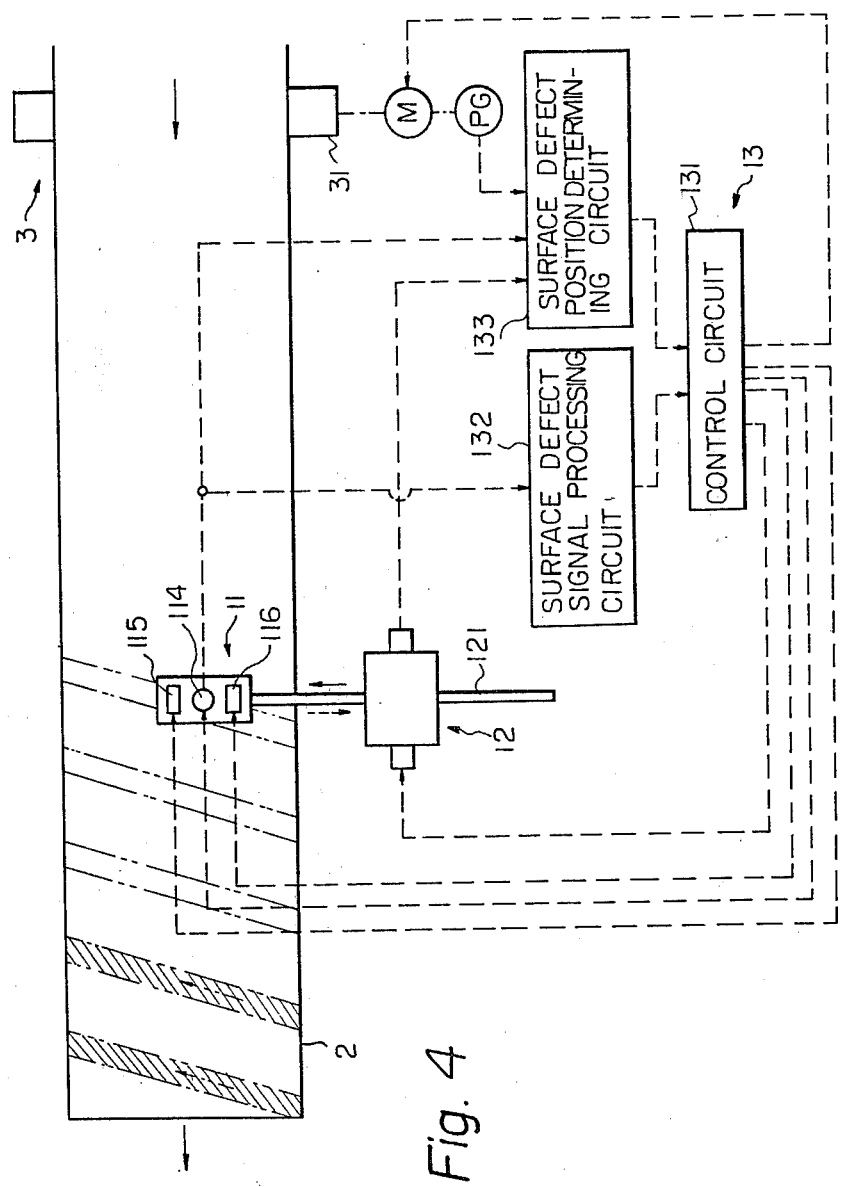
FIG. 4 is a schematic diagram similar to FIG. 3, of another embodiment.

In the embodiment having two scarfing torches 115 and 116 as shown in FIGS. 2 and 4, the surface defects can be scarfed immediately after they are detected.

The control device 13 shown in FIG. 4 is substantially identical to the device of FIG. 3 except in that the former is provided additionally with means for transmitting the scarfing control signal from the control circuit 131 to the scarfing torch 116. In this embodiment, the scarfing torch 115 performs preliminary scarfing, the detector probe 114 behind the torch 115 performs flaw detection, and the added scarfing torch 116 immediately performs scarfing of the surface defects according to the results of the flaw detection by the detector probe.

INDUSTRIAL APPLICABILITY

By the use of the steel surface inspecting apparatus according to the present invention, the heretofore impossible automatic inspection of steel material having a rough surface is made possible, the processing steps from inspection to scarfing can be carried out in a continuous operation, operation steps are rationalized, and considerable reduction in time and labor can be achieved. Further, highly reliable inspection results are obtained. The apparatus according to the present invention is applicable to inspection of cold-rolled, warm-rolled and hot-rolled steels.

We claim:

1. A steel surface inspection apparatus, comprising:
 a detection head including a detector probe and a scarfing torch;
 a drive mechanism for moving said detection head for scanning along a predetermined path; and
 a control device for controlling operation of said detection head and said drive mechanism, said apparatus being characterized in that said scarfing torch is disposed forwardly of said detector probe with respect to the scanning direction of said detector head, the surface of the path to be scanned by said head is scarfed smooth before flaw detection by said scarfing torch, and after the flaw detection surface defects are scarfed away by said scarfing torch according to the results of the flaw detection.

2. A steel surface inspection apparatus as set forth in claim 1, characterized in that a first scarfing torch and a second scarfing torch are disposed forwardly and rearwardly of said detector probe with respect to the scanning direction of said detector head, respectively, the surface of the path to be scanned by said head is scarfed smooth before flaw detection, by said first scarfing torch, and after the flaw detection surface defects are scarfed away by said second scarfing torch according to the results of the flaw detection.

* * * * *